United States Patent
Matsui

(10) Patent No.: US 11,352,022 B2
(45) Date of Patent: Jun. 7, 2022

(54) VEHICLE NOTIFICATION APPARATUS

(71) Applicant: Toyota Jidosha Kabushiki Kaisha, Toyota (JP)

(72) Inventor: Noriyoshi Matsui, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/152,969

(22) Filed: Jan. 20, 2021

(65) Prior Publication Data

US 2021/0229693 A1    Jul. 29, 2021

(30) Foreign Application Priority Data

Jan. 24, 2020 (JP) .............................. JP2020-009616

(51) Int. Cl.
  *B60Q 1/00*     (2006.01)
  *B60W 50/14*    (2020.01)
  *B60W 40/105*   (2012.01)

(52) U.S. Cl.
  CPC .......... *B60W 50/14* (2013.01); *B60W 40/105* (2013.01)

(58) Field of Classification Search
  CPC ..... B60W 50/14; B60W 40/105; B60T 8/171; B60T 2270/406; B60T 2270/413; B60T 8/885; B60T 8/329
  USPC .......................... 340/441, 444, 453, 438, 454
  See application file for complete search history.

(56) References Cited

U.S. PATENT DOCUMENTS

| | | | |
|---|---|---|---|
| 6,167,354 A * | 12/2000 | Maleki | B60T 17/221 |
| | | | 701/79 |
| 6,290,027 B1 | 9/2001 | Matsuzaki | |
| 8,985,283 B2 * | 3/2015 | Oshio | F16D 65/12 |
| | | | 188/162 |
| 10,501,064 B2 * | 12/2019 | Pinto, IV | B60T 7/22 |
| 11,225,254 B2 * | 1/2022 | Takagi | B60W 50/14 |
| 2018/0112732 A1 | 4/2018 | Arakane | |

FOREIGN PATENT DOCUMENTS

| | | |
|---|---|---|
| JP | 2000-035068 A | 2/2000 |
| JP | 2006-264614 A | 10/2006 |
| JP | 2013-035432 A | 2/2013 |
| JP | 2015-042503 A | 3/2015 |
| JP | 2016-194367 A | 11/2016 |

* cited by examiner

*Primary Examiner* — Anh V La
(74) *Attorney, Agent, or Firm* — Dinsmore & Shohl LLP

(57) ABSTRACT

The vehicle notification apparatus comprises: a brake device configured to press a frictional member against a rotating member; a wheel rotational speed sensor configured to generate a detection signal every time the wheel rotates by a predetermined angle; a notification execution device; and a control unit configured to obtain a wheel rotational speed based on the detection signal. The control unit is configured to: determine that a specific variation in the wheel rotational speed has occurred when the wheel rotational speed is determined to satisfy a predetermined specific variation occurrence condition; obtain, as a specific variation rotational angle position, a rotational position of when the specific variation has occurred based on the detection signal; specify a factor that has actually caused the specific variation based on the specific variation rotational angle position; and let the notification execution device provide information regarding the specified factor.

7 Claims, 13 Drawing Sheets

VEHICLE NOTIFICATION APPARATUS

CROSS-REFERENCE TO RELATED APPLICATIONS

This application claims priority to Japanese Patent Application No. 2020-009616 filed on Jan. 24, 2020, which is incorporated herein in its entirety.

TECHNICAL FIELD

The present disclosure relates to a vehicle notification apparatus configured to specify (detect) a factor causing a specific variation in a wheel rotational speed (or wheel speed) when the specific variation occurs, and to be able to perform a notification based on (in accordance with) the specified factor.

BACKGROUND

There have been known vehicle notification apparatuses configured to detect a defect based on a detected signal of a wheel rotational speed sensor, and to perform notification regarding the defect.

The known vehicle notification apparatuses include "a first conventional apparatus disclosed in Japanese Patent Application Laid-Open (kokai) No. 2006-264614" and "a second conventional apparatus disclosed in Japanese Patent Application Laid-Open (kokai) No. 2013-35432".

The first conventional apparatus detects a brake vibration caused by a partial/uneven wear of a disc rotor based on a variation in a so-called passing time $\Delta Tk$ of each of teeth of a sensor rotor for a wheel speed sensor. More specifically, the first conventional apparatus firstly measures a passing time $\Delta T$ taken for one of the teeth to pass the sensor and obtains average Tave of the passing times $\Delta T$. Subsequently, the first conventional apparatus obtains a ratio $\alpha k$ of the passing time $\Delta Tk$ to the average Tave for each of the teeth. Thereafter, the first conventional apparatus selects a maximum value and a minimum value from the thus obtained ratios $\alpha k$, and obtains a difference between the maximum value and the minimum value as an amplitude A. The first conventional apparatus determines whether or not the partial wear of the disc rotor has occurred based on the amplitude A.

The second conventional apparatus monitors a reduction in a thickness of a frictional sliding part and cooling fins of a disc rotor based on a brake fluid pressure Pb and rotational speed n of a tire, and performs a notification in accordance with the monitoring result. More specifically, the second conventional apparatus determines that the thickness of the above-mentioned parts is reduced when an N-order vibration in the rotation of the tire is occurring (wherein "N" coincides with the number N of the cooling fins of the disc rotor).

SUMMARY

Each of the first and second conventional apparatuses determines whether or not the (partial) wear of the disc rotor has occurred based on the variation in the wheel rotational speed. Meanwhile, the variation in the wheel rotational speed is caused not only by the partial wear of the disc rotor but also by another factors. Therefore, each of the first and second conventional apparatuses may mistakenly/erroneously determine that the partial wear of the disc rotor has occurred, or may not be able to specify the factor causing the variation in the wheel rotational speed.

The present disclosure is made to cope with the problems described above. Thus, one of the objectives of the present disclosure is to provide a vehicle notification apparatus that is capable of correctly specifying a factor causing the variation in the wheel rotational speed and of notifying a user (a passenger including a driver, or a manager of the vehicle) of the specified factor.

The vehicle notification apparatus according to the present disclosure comprises:
  a brake device (20FL to 20RR) configured to press a frictional member (23a, 23b) against a rotating member (21) rotating integrally with a wheel, when a brake requirement for a vehicle is generated so as to apply frictional brake torque to the wheel;
  a wheel rotational speed sensor (50FL to 50RR) configured to generate a detection signal every time the wheel rotates by a predetermined angle;
  a notification execution device (80) configured to notify a passenger of the vehicle or a manager of the vehicle; and
  a control unit (40) configured to obtain a wheel rotational speed that is a rotational speed of the wheel based on the detection signal.

The control unit is configured to:
  determine whether or not the wheel rotational speed satisfies a predetermined specific variation occurrence condition (step 720);
  determine that a specific variation in the wheel rotational speed that does not occur in a normal driving state has occurred, when the wheel rotational speed is determined to satisfy the predetermined specific variation occurrence condition (step 720: Yes);
  obtain, as a specific variation rotational angle position, a rotational position of the wheel of when the specific variation has occurred with reference to a predetermined reference position of the wheel, based on the detection signal (step 725);
  specify a factor that has caused the specific variation based on the specific variation rotational angle position (step 740, step 800 to step 895); and
  let the notification execution device notify the passenger or the manager of information regarding the specified factor (step 745).

In some embodiment, the control unit is configured to:
  have stored a plurality of factors causing the specific variation and a plurality of registered rotation angles in a memory while correlating the factors with the respective registered rotation angles, in advance; and
  determine that the factor actually causing the specific variation is one of the factors that has been stored in the memory and that is correlated with one of the registered rotation angles that is determined to coincide with the specific variation rotational angle position (step 830 to step 855).

It has turned out that the rotation angle of when the specific variation occurs varies depending on the factor causing the specific variation. The factor includes, for example, wear of the frictional member, thickness unevenness occurred in the rotating member, and rust formed between the frictional member and the rotating member. In view of this, the vehicle notification apparatus according to the present disclosure is configured to specify the factor actually causing the specific variation based on the specific variation rotational angle position. Therefore, the vehicle notification apparatus can correctly specify the factor actually causing the specific variation and notify the passenger or the manager of the specified factor.

In some embodiments, the brake device comprises a mounting plate (24a, 24b) configured to press the frictional member against the rotating member;

the rotating member comprises a first projection part (25a, 25b, 28a) and a second projection part (26a, 26b, 28b) that the mounting plate contact when the frictional member has worn by a predetermined amount or more so as to cause the specific variation, wherein the first projection part and the second projection part are formed in such a manner that the first projection part and the second projection part are apart from each other to form a predetermined central angle (θd) with reference to a rotation center of the rotating member; and the control unit is configured to:

have stored wear of the frictional member as one of the plurality of the factors and the predetermined central angle as one of the plurality of registered rotation angles in the memory while correlating the wear of the frictional member with the predetermined central angle;

obtain, when the specific variation has occurred twice per one rotation of the wheel while the brake requirement is being generated, a magnitude of difference (θ8) between the specific variation rotational angle positions, each being detected when each of the specific variation has occurred, as a rotational angle corresponding to the specific variation rotational angle position; and determine that the factor actually causing the specific variation is the wear of the frictional member (step 835), when the obtained magnitude of difference as the rotational angle is determined to coincide with the predetermined central angle stored as one of the plurality of registered rotation angles (step 830: Yes).

In some embodiments, the brake device comprises a mounting plate (24a, 24b) configured to press the frictional member against the rotating member;

the rotating member comprises a projection part that the mounting plate contact when the frictional member has worn by a predetermined amount or more so as to cause the specific variation, wherein the projection part is formed at a predetermined wear determination rotational angle position (θd) with reference to the reference position; and the control unit is configured to:

have stored wear of the frictional member as one of the plurality of the factors and the wear determination rotational angle position as one of the plurality of registered rotation angles in the memory while correlating the wear of the frictional member with the wear determination rotational angle position; and determine that the factor actually causing the specific variation is the wear of the frictional member (step 835), when the specific variation rotational angle position is determined to coincide with the wear determination rotational angle position while the brake requirement is being generated (step 830: Yes).

The thus configured vehicle notification apparatus can determine that the factor actually causing the specific variation is the wear of the frictional member by simply providing a projection part(s) to the rotating member. Consequently, the wear of the frictional member can be detected without increasing a cost of the brake device and thus of the vehicle.

In some embodiments, the rotating member is fixed to the vehicle in such a manner that an uneven part of a cast structure in the rotating member is positioned at a thickness unevenness determination rotational angle position (θn) with reference to the reference position; and the control unit is configured to:

have stored thickness unevenness caused by the uneven part and a part other than the uneven part as one of the plurality of the factors and the thickness unevenness determination rotational angle position as one of the plurality of registered rotation angles in the memory while correlating the thickness unevenness with the thickness unevenness determination rotational angle position; and determine that the factor actually causing the specific variation is the thickness unevenness (step 855), when the specific variation rotational angle position is determined to coincide with the thickness unevenness determination rotational angle position while the brake requirement is being generated (step 850: Yes).

The thus configured vehicle notification apparatus can determine that the factor actually causing the specific variation is the thickness unevenness that has occurred between the uneven part and the part other than the uneven part of the rotating member, by simply fixing the rotating member to the vehicle in such a manner that the uneven part is positioned at the predetermined rotational angle position (θn) with reference to the reference position.

In some embodiments, the control unit is configured to:

have stored rust formed between the frictional member and the rotating member while the vehicle is stopped as one of the plurality of the factors and a stopped state rotational angle position (θst) as one of the plurality of registered rotation angles in the memory while correlating the rust with the stopped state rotational angle position, wherein the stopped state rotational angle position is a rotational angle position obtained when a stopped time length of the vehicle reaches a predetermined time (step 925: Yes); and determine that the factor actually causing the specific variation is the rust (step 845), when the specific variation rotational angle position is determined to coincide with the stopped state rotational angle position while the brake requirement is being generated (step 840: Yes).

The thus configured vehicle notification apparatus can determine that the factor actually causing the specific variation is the rust formed between the frictional member and the rotating member, by simply memorizing the rotational angle when the vehicle is stopped for the predetermined time or more.

In some embodiments, the control unit is configured to:

have stored deformation of a tire included in the wheel that is formed at a part of the tire contacting a ground while the vehicle is stopped as one of the plurality of the factors and a stopped state rotational angle position (θst) as one of the plurality of registered rotation angles in the memory while correlating the deformation of the tire with the stopped state rotational angle position, wherein the stopped state rotational angle position is a rotational angle position obtained when a stopped time length of the vehicle reaches a predetermined time (step 925: Yes); and determine that the factor actually causing the specific variation is the deformation of the tire, when the specific variation rotational angle position is determined to coincide with the stopped state rotational angle position while the brake requirement is not being generated (step 870).

The thus configured vehicle notification apparatus can determine that the factor actually causing the specific variation is the deformation of the tire that has occurred at the part of the tire that has contacted the ground while the vehicle has been stopped, by simply memorizing the rotational angle when the vehicle is stopped for the predetermined time or more.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION

Figure 1:
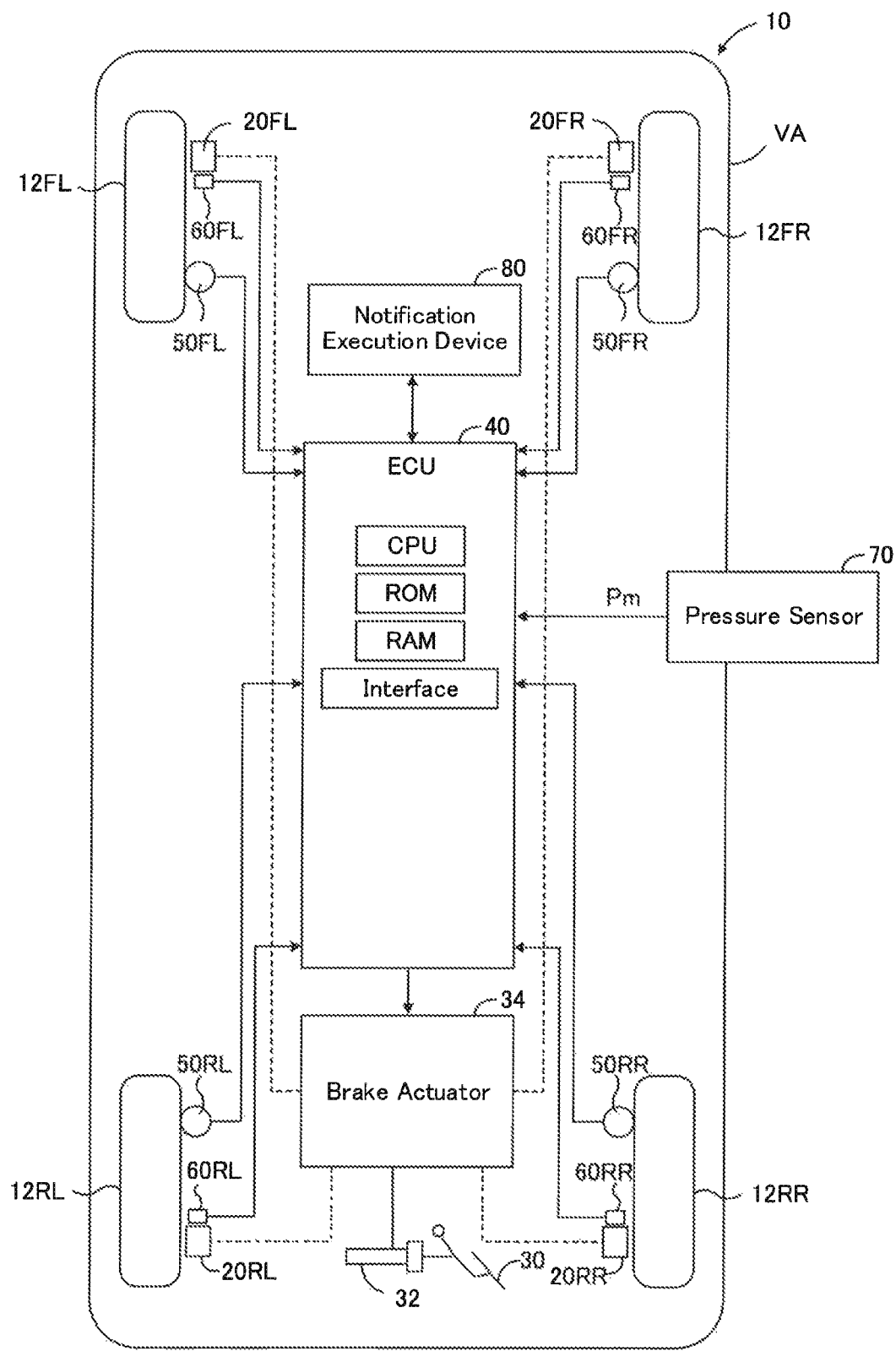
FIG. 1 is a schematic diagram of a vehicle notification apparatus according to an embodiment of the present disclosure.

A vehicle notification apparatus (hereinafter, sometimes referred to as a "present apparatus") according to an embodiment of the present disclosure will be described with reference to the drawings. FIG. 1 shows the present apparatus 10 and a vehicle VA to which the present apparatus 10 is applied.

The vehicle VA comprises four of wheels (namely, a front left wheel 12FL, a front right wheel 12FR, a rear left wheel 12RL, and a rear right wheel 12RR). When the wheels 12FL to 12RR need not be distinguished from each other, each of them is simply referred to as a "wheel 12".

Figure 2:
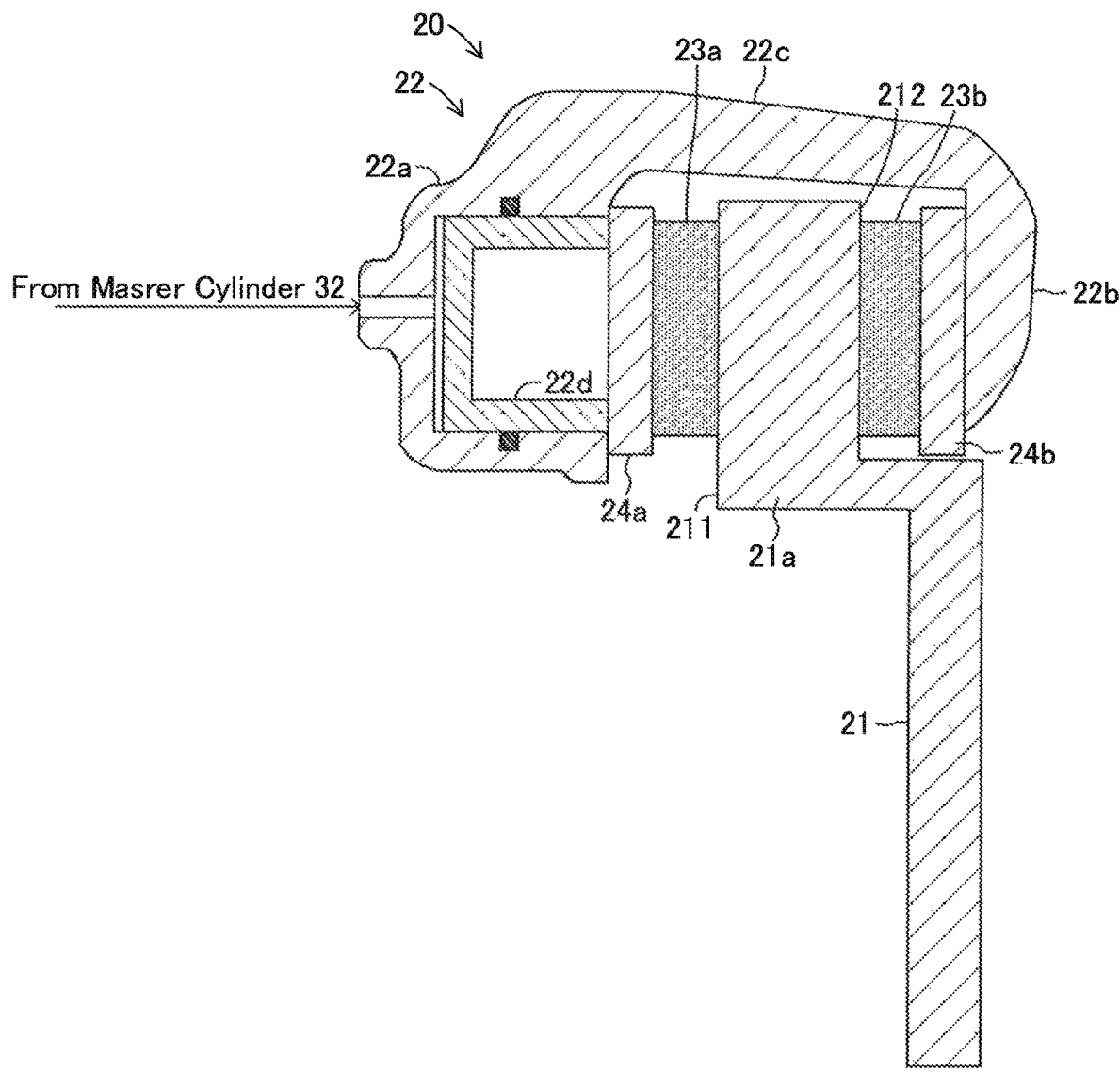
FIG. 2 is a sectional view of a part of the disc brake device shown in FIG. 1.

The vehicle VA further comprises disc brake devices 20FL, 20FR, 20RL, and 20RR that apply frictional brake torque to the wheels 12FL, 12FR, 12RL, and 12RR, respectively. When the disc brake devices 20FL to 20RR need not be distinguished from each other, each of them is simply referred to as a "disc brake device 20". The disc brake device 20 (expect a rotor 21) itself is well known and is disclosed, for example, in Japanese Patent Application Laid-Open (kokai) No. 2013-35432. Thus, the disc brake device 20 will next be briefly described with reference to FIG. 2.

Figure 3:
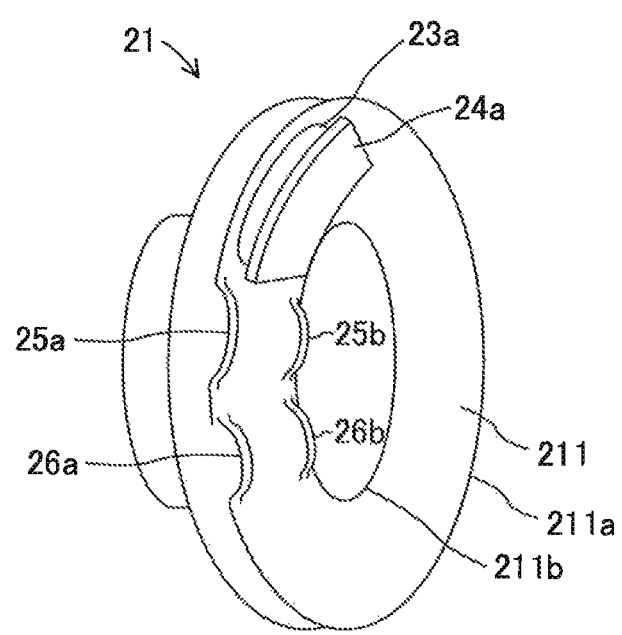
FIG. 3 is an oblique perspective view of the disc rotor shown in FIG. 2.

The disc brake device 20 comprises a disc rotor 21 as a rotating member and a brake caliper 22. As shown in FIG. 3, the disc rotor 21 is a disc-like member and rotates together (integrally) with the wheel 12 around a rotation axis of the wheel 12. More specifically, a rotation axis part of the disc rotor is rotatably supported through a bearing by a knuckle forming an unillustrated suspension device. The disc rotor 21 has a frictional sliding part 21a at an outer peripheral part of the rotor 21. Brake pads (frictional members) 23a, 23b attached to the brake caliper 22 are pressed against surfaces of the frictional sliding part 21a so as to frictionally slide on the surfaces of the frictional sliding part 21a.

The brake caliper 22 is movably supported by an unillustrated mounting bracket fixed to a vehicle body of the vehicle VA so as to be able to move in a direction orthogonal to the surfaces of the frictional sliding part 21a (i.e., in a direction along the rotation axis of the disc rotor 21). The brake caliper 22 assumes a U-shaped cross sectional shape to step over the frictional sliding part 21a, and includes a cylinder part 22a, a claw part 22b, a connecting part 22c, and a piston 22d.

The brake fluid whose pressure is adjusted in accordance with a depression amount of a brake pedal 30 (refer to FIG. 1) operated by the driver of the vehicle VA is supplied to the cylinder part 22a through a master cylinder 32 (refer to FIG. 1). The pressure of the brake fluid adjusted by the master cylinder 32 in accordance with the depression amount of the brake pedal 30 is referred to as a "master cylinder pressure Pm". The claw part 22b is arranged at a position so as to face with/to the cylinder part 22a via the frictional sliding part 21a. The connecting part 22c connects the cylinder part 22a with the claw part 22b. The piston 22d is in the cylinder part 22a and moves in response to the master cylinder pressure Pm. More specifically, the piston 22d moves toward the frictional sliding part 21a as the master cylinder pressure Pm becomes higher. Whereas, the piston 22d moves away from the frictional sliding part 21a as the master cylinder pressure Pm becomes lower.

A pair of the brake pads 23a and 23b are assembled/arranged so as to sandwich the frictional sliding part 21a of the disc rotor 21. The brake pad 23a is disposed on a mounting plate 24a at a side of the cylinder part 22a. The brake pad 23b is disposed on a mounting plate 24b at a side of the claw part 22b. When the brake pads 23a and 23b need not be distinguished from each other, each of them is referred to as a "brake pad 23".

An outer shape of the mounting plate 24a is larger than an outer shape of the brake pad 23a. Therefore, the outer periphery of the mounting plate 24a is positioned at outer side of the outer periphery of the brake pad 23a in a radial direction of the disc rotor 21. In addition, the inner periphery of the mounting plate 24a is positioned at inner side of the inner periphery of the brake pad 23a in the radial direction of the disc rotor 21.

Similarly, an outer shape of the mounting plate 24b is larger than an outer shape of the brake pad 23b. Therefore, the outer periphery of the mounting plate 24b is positioned at outer side of the outer periphery of the brake pad 23b in the radial direction of the disc rotor 21. In addition, the inner periphery of the mounting plate 24b is positioned at inner side of the inner periphery of the brake pad 23b in the radial direction of the disc rotor 21.

As the master cylinder pressure Pm becomes higher, the piston 22d moves so as to come closer to the disc rotor 21, and thus, the mounting plate 24a presses the brake pad 23a against a first sliding surface 211 of the frictional sliding part 21a so that the brake pad 23a is pressed against the first sliding surface 211. When the master cylinder pressure Pm becomes much higher, the cylinder part 22a moves away from the disc rotor 21, and this causes the claw part 22b to move so as to come closer to the disc rotor 21. Thus, the mounting plate 24b presses the brake pad 23b against a second sliding surface 212 of the frictional sliding part 21a so that the brake pad 23b is pressed against the second sliding surface 212. Consequently, the frictional sliding part 21a is strongly sandwiched between the brake pad 23a and the brake pad 23b, and thus, the frictional brake torque is generated.

As shown in FIG. 3, a first projection part (or a first protrusion) 25a and a second projection part (or a second protrusion) 26a are formed on the first sliding surface 211 at a part in a circumferential direction of an outer peripheral part 211a in the vicinity of the outer periphery of the first sliding surface 211. Furthermore, a first projection part (or a first protrusion) 25b and a second projection part (or a second protrusion) 26b are formed on the first sliding surface 211 at a part in the circumferential direction of an inner peripheral part 211b in the vicinity of the inner periphery of the first sliding surface 211. Both of the outer peripheral part 211a and the inner peripheral part 211b belong to (or are within) "an uncontacted/unabutted area/part that is a part with which the brake pad 23a does not contact". The first projection parts 25a, 25b and the second projection parts 26a, 26b are protruded/projected in such a manner that they contact (start to contact) with the mounting plate 24a (mounting member 24a) when the brake pad 23a has worn by a predetermined amount or more. In other words, when the thickness of the brake pad 23a has decreased by the predetermined amount or more, the peripheral parts of the mounting member 24a contact with the projection parts 25a, 25b, 26a, and 26b. More specifically, when the brake pad 23a has worn by the predetermined amount or more, the first projection part 25a and the second projection part 26a contact with an outer peripheral part of the mounting plate 24a, and the first projection part 25b and the second projection part 26b contact with an inner peripheral part of the mounting plate 24a.

When the first projection part 25a and the first projection part 25b need not be distinguished from each other, each of them is referred to as "a first projection part 25". When the second projection part 26a and the second projection part 26b need not be distinguished from each other, each of them is referred to as "a second projection part 26".

Figure 4:
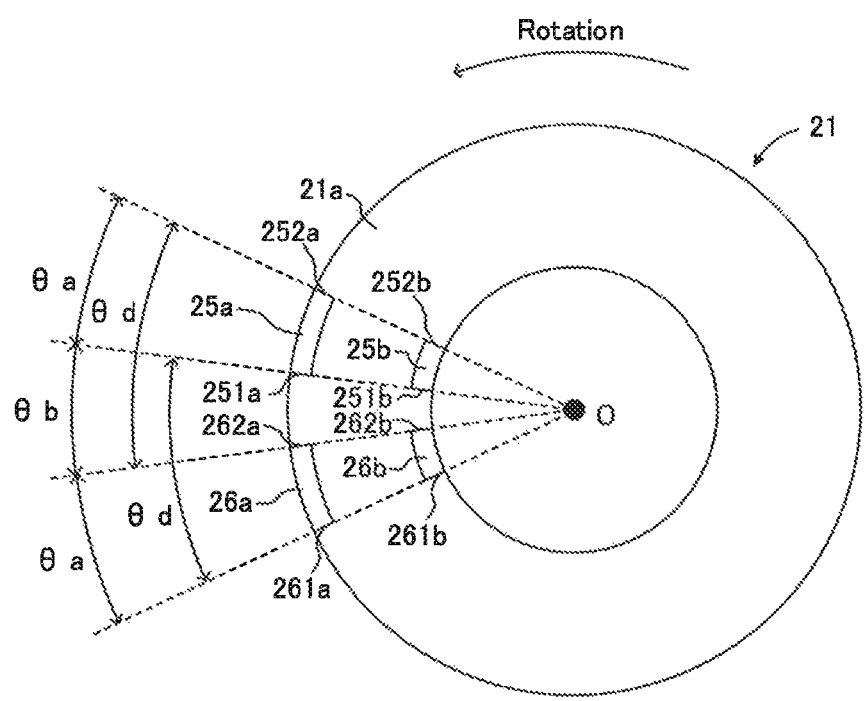
FIG. 4 is a plan view of the disc rotor shown in FIG. 2.

As shown in FIG. 4, one of edges of the first projection part 25 (i.e., an edge 251a and an edge 251b) and one of edges of the second projection part 26 (i.e., an edge 261a and an edge 261b) are arranged so as to form a predetermined angle (central angle) θd with respect to (or around) a center point (rotational center) O of the disc rotor 21. Similarly, the other of edges of the first projection part 25 (i.e., an edge 252a and an edge 252b) and the other of edges of the second projection part 26 (i.e., an edge 262a and an edge 262b) are arranged so as to form the predetermined angle (central angle) θd with respect to the center point O.

The one of edges of the first projection part 25 (i.e., the edge 251a and the edge 251b) and the other of edges of the first projection part 25 (i.e., the edge 252a and the edge 252b) are on respective two sides of a sector whose center is at the center point O and whose central angle is equal to θa.

The one of edges of the second projection part 26 (i.e., the edge 261a and the edge 261b) and the other of edges of the second projection part 26 (i.e., the edge 262a and the edge 262b) are on respective two sides of a sector whose center is at the center point O and whose central angle is equal to θa.

Furthermore, the one of edges of the first projection part 25 (i.e., the edge 251a and the edge 251b) and the other of edges of the second projection part 26 (i.e., the edge 262a and the edge 262b) are on respective two sides of a sector whose center is at the center point O and whose central angle is equal to θb.

Referring back to FIG. 1, the present apparatus (vehicle notification apparatus) 10 comprises an ECU 40. ECU is an abbreviation of Electronic Control Unit. The ECU 40 comprises, as a main component, a microcomputer. The microcomputer includes a CPU, a ROM, a RAM, a readable and writable nonvolatile memory, and an interface I/F. The CPU achieves various functions through executing instructions (or programs/routines) stored in the ROM.

The ECU 40 is communicably connected with wheel rotational speed sensors (wheel speed sensors) 50FL, 50FR, 50RL, and 50RR for respective wheels 12 and with disc rotor temperature sensors 60FL, 60FR, 60RL, and 60RR for respective wheels 12. When the wheel rotational speed sensors 50FL, 50FR, 50RL, and 50RR need not be distinguished from each other, each of them is referred to as a "wheel rotational speed sensor 50". When the disc rotor temperature sensors 60FL, 60FR, 60RL, and 60RR need not be distinguished from each other, each of them is referred to as a "disc rotor temperature sensor 60".

Figure 5:
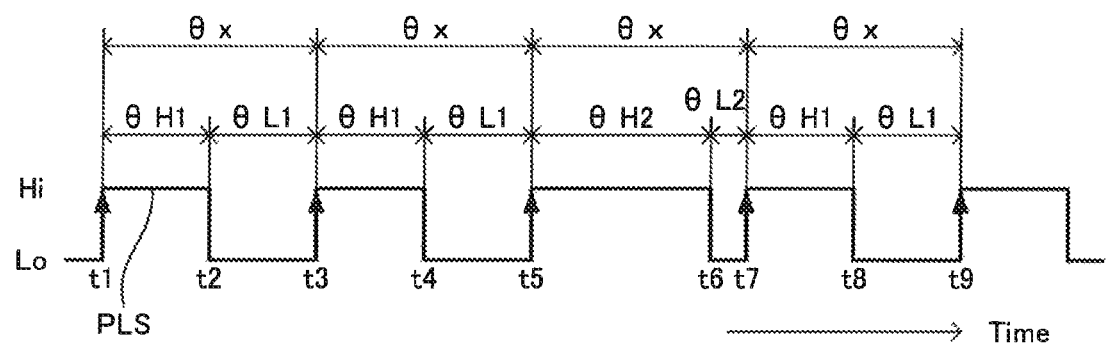
FIG. 5 is a timing chart illustrating a detection signal of the wheel rotational speed sensor shown in FIG. 1.

The wheel rotational speed sensor 50 includes an unillustrated sensor rotor that rotates together (integrally) with the wheel 12 and the disc rotor 21, and an unillustrated magnetic detection/sensing part. The magnetic detection part may include a Hall element or a magnetic resistance element. The magnetic detection part generates a pulse signal PLS, in response to a change in a magnetic field that is varied by a N pole and an S pole, that are formed alternately at a periphery of a sensor rotor at a predetermined interval, every time the sensor rotor rotates by a constant (predetermined) angle θx (e.g., 7.5 degree). More specifically, as shown in FIG. 5, the pulse signal PLS rises up from a low level signal Lo to a high level signal Hi every time the sensor rotor rotates by the angle θx. The magnetic detection sends the pulse signal PLS to the ECU 40. The angle θx is sufficiently small with respect to the above described angles θd, θa, θb. For example, the angle θx is one-fifth of each of the angles θd, θa, θb.

More specifically, as shown in FIG. 5, the pulse signal PLS changes from the high level signal Hi to the low level signal Lo (refer to time points t2, t4, t8) when the sensor rotor rotates by the angle θH1 after the pulse signal PLS has changed from the low level signal Lo to the high level signal Hi (refer to time points t1, t3, t7) Furthermore, the pulse signal PLS changes from the low level signal Lo to the high level signal Hi (refer to time points t3, t5, t9) when the sensor rotor rotates by the angle θL1 after the pulse signal PLS has changed from the high level signal Hi to the low level signal Lo (refer to time points t2, t4, t8). In the present embodiment, the angle θH1 and the angle θL1 are equal to each other. A sum (θH1+θL1) of the angle θH1 and the angle θL1 is equal to the angle θx.

It should be noted that the sensor rotor has a reference (base) position. When the reference position of the sensor rotor faces with the magnetic detection part, the pulse signal PLS changes from the high level signal Hi to the low level signal Lo (refer to time point t6) when the sensor rotor rotates by the angle θH2 after the pulse signal PLS has changed from the low level signal Lo to the high level signal Hi (refer to time point t5) Furthermore, the pulse signal PLS changes from the low level signal Lo to the high level signal Hi (refer to time point t7) when the sensor rotor rotates by the angle θL2 after the pulse signal PLS has changed from the high level signal Hi to the low level signal Lo (refer to time point t6). The angle θH2 is sufficiently greater than the angle θL2. For example, the angle θH2 is five times greater than the angle θL2. A sum (θH2+θL2) of the angle θH2 and the angle θL2 is equal to the angle θx.

The ECU 40 measures/obtains a time (time length) Δt between two adjacent/successive rising edges of the pulse signal PLS. In other words, the time Δt is equal to a time length from a time point when the pulse signal PLS previously changed from the low level signal Lo to the high level signal Hi to a time point when the pulse signal PLS currently changes from the low level signal Lo to the high level signal Hi. The time Δt is, for example, a time between the time point t1 and the time point t3, a time between the time point t3 and the time point t5, a time between the time point t5 and the time point t7, and a time between the time point t7 and the time point t9, in the example shown in FIG. 5. The ECU 40 measures/obtains the wheel rotational speed based on the time Δt.

In addition, the ECU 40 measures/obtains both a time Δth and a time Δtl. The time Δth is a time length of a period where the pulse signal PLS is the high level signal Hi, and the time Δtl is a time length of a period where the pulse signal PLS is the low level signal Lo that follows the last high level signal Hi. The ECU 40 determines whether or not a magnitude of a difference between the time Δth and the time Δtl is equal to or larger than a predetermined value. When it is determined that the magnitude of the difference is equal to or larger than the predetermined value, the ECU 40 determines that the sensor rotor is at the reference position. The wheel rotational speed sensor 50 is fixed in such a manner that the reference position of the sensor rotor coincides with a specific position (reference position) of the wheel 12 in a rotational direction of the wheel 12. It should be noted that, as the wheel rotational speed sensor 50, a sensor disclosed in Japanese Patent Application Laid-Open (kokai) No. 2015-42503 may be employed.

The disc rotor temperature sensor 60 is a temperature sensor configured to measure/detect a temperature of the disc rotor 21. The disc rotor temperature sensor 60 sends a signal indicative of the measured temperature to the ECU 40.

The ECU 40 is connected with a pressure sensor 70. The pressure sensor 70 is configured to measure/detect the master cylinder pressure Pm, and sends a signal indicative of the measured master cylinder pressure Pm to the ECU 40.

The ECU 40 is connected with a notification execution device 80. The notification execution device 80 may include a display and a speaker. When the ECU 40 determines that "a specific variation that is different from a vibration observed in a normal case and will be described later" in the wheel rotational speed of one specific wheel 12 has occurred, the ECU 40 determines that a defect has occurred in the disc brake device 20 corresponding to the specific wheel 12 or in the tire corresponding to the specific wheel 12. In this case, the ECU 40 further specifies the factor for the defect, and sends a notification message corresponding to the specified factor to the notification execution device 80.

(Outline of Operation)

As described above, the ECU 40 obtains the time (time length) Δt between two adjacent/successive rising edges of the pulse signal PLS, every time the rising edge of the pulse signal PLS is detected, and obtains the wheel rotational speed of the wheel 12 based on the time Δt.

The ECU 40 determines whether or not the wheel rotational speed of the wheel 12 satisfies at least one of specific variation occurrence conditions described below so as to determine whether or not the specific variation has been occurring. The ECU 40 performs this process for each of the wheels 12FL, 12FR, 12RL, and 12RR.

(Specific Variation Occurrence Condition No. 1)

The ECU 40 obtains the wheel rotational speed Vw(n) at the present time point in a manner described above, when the rising edge of the pulse signal PLS of the wheel rotational speed sensor 50 for one certain wheel 12 (hereinafter, referred to as a "focused wheel 12") is detected. The wheel rotational speed Vw(n) at the present time point may be referred to as "a current speed Vw(n)".

The ECU 40 determines/infers a "permissible (tolerable) range within which the current speed Vw(n) is inferred to fall", based on a previous speed Vw(n−1) that was obtained as the wheel rotational speed when the rising edge of the pulse signal PLS of the wheel rotational speed sensor 50 for the focused wheel 12 was previously detected.

The ECU 40 determines that the wheel rotational speed of the focused wheel 12 has satisfied the specific variation occurrence condition No. 1 when the actually obtained current speed Vw(n) is not within the permissible range, and thus, determines that the specific variation has occurred in the wheel rotational speed of the focused wheel 12.

The permissible range may be a range from a lower limit obtained by subtracting a predetermined positive value α from the previous speed Vw(n−1) to an upper limit obtained by adding a predetermined positive value β to the previous speed Vw(n−1).

(Specific Variation Occurrence Condition No. 2)

The ECU 40 extrapolates an extrapolated wheel rotational speed Ve that is an extrapolated value for the current speed Vw(n) for the focused wheel 12 using the following equation, when the rising edge of the pulse signal PLS of the wheel rotational speed sensor 50 for the focused wheel 12 is detected. In the following equation, Vw(n−2) is a wheel rotational speed that was obtained when the rising edge of the pulse signal PLS of the wheel rotational speed sensor 50 for the focused wheel 12 was more previously detected prior to the time point at which the previous speed Vw(n−1) was obtained.

$$Ve = Vw(n-1) + (Vw(n-1) - Vw(n-2))$$

The ECU 40 determines that the wheel rotational speed of the focused wheel 12 has satisfied the specific variation occurrence condition No. 2 when a magnitude ΔV1 (ΔV1=|Ve−Vw(n)|) of a difference between the extrapolated wheel rotational speed Ve and the actually obtained current speed Vw(n) is equal to or larger than a positive threshold ΔVw1$th$, and thus, determines that the specific variation has occurred in the wheel rotational speed of the focused wheel 12.

(Specific Variation Occurrence Condition No. 3)

The ECU 40 obtains through calculation an average value VwAVE of wheel rotational speeds of the four wheels, every time any one of wheel rotational speeds is updated/renewed. When a magnitude $\Delta V2$ ($\Delta V2=|VwAVE-Vw(n)|$) of a difference between the actually obtained current speed $Vw(n)$ of the focused wheel 12 and the average value VwAVE is equal to or larger than a positive threshold $\Delta Vw2th$, the ECU 40 determines that the wheel rotational speed of the focused wheel 12 has satisfied the specific variation occurrence condition No. 3, and thus, determines that the specific variation has occurred in the wheel rotational speed of the focused wheel 12.

(Specific Variation Occurrence Condition No. 4)

When "the number of times of successively determining that the magnitude $\Delta V2$ ($\Delta V2=|VwAVE-Vw(n)|$) of the difference regarding the focused wheel 12 is equal to or larger than the positive threshold $\Delta Vw2th$" becomes equal to or greater than a predetermined number, the ECU 40 determines that the wheel rotational speed of the focused wheel 12 has satisfied the specific variation occurrence condition No. 4, and thus, determines that the specific variation has occurred in the wheel rotational speed of the focused wheel 12.

When the ECU 40 determines that the specific variation has occurred in the wheel rotational speed of any one of the wheels 12FL, 12FR, 12RL, and 12RR, the ECU 40 specifies the factor causing the specific variation based on a "specific variation rotational angle $\theta s$ (referred sometimes to as "a specific variation rotational angle position"). The specific variation rotational angle position is "an angle of the sensor rotor" that is observed when the specific variation has occurred, wherein the sensor rotor corresponds to (or is included in) the wheel rotational speed sensor 50 showing the specific variation.

More specifically, registered rotation angles $\theta r$ together with respective factors (types of factors) each causing the specific variation have been stored in the memory (the ROM and/or the nonvolatile memory) of the ECU 40. Each of the registered rotation angles $\theta r$ is an angle of the sensor rotor at which the specific variation will be observed when a defect occurs or is a difference of angles at which the specific variations will be observed when the specific variation continuously/successively occurs. In other words, relationships between the registered rotation angles $\theta r$ and the factors each causing the specific variation have been stored in the memory of the ECU 40. When the ECU 40 determines that the specific variation has occurred, the ECU 40 tries to find the one of registered rotation angles $\theta r$ stored in the memory that coincides with the specific variation rotational angle $\theta s$, and specifies the factor corresponding to the registered rotation angles $\theta r$ that coincides with the specific variation rotational angle $\theta s$ as the factor that is actually causing the (actual) specific variation.

The factors for the defects (i.e., the specific variations) that the ECU 40 can specify includes the following Factors 1 to 3 and will next be described.

Factor 1: Wear of the brake pad 23
Factor 2: Rust formed between the brake pad 23 and the frictional sliding part 21a
Factor 3: Uneven thickness (unevenness in thickness) of the disc rotor 21

<Factor 1>

Figure 6:
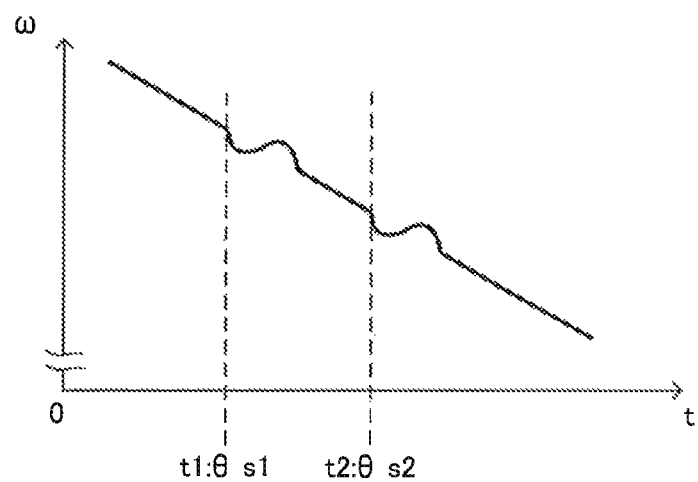
FIG. 6 is a graph showing a wheel rotational speed with respect to time to describe a specific variation in the wheel rotational speed.

As described above, when the brake pad 23a has worn by the predetermined amount or more, the first projection part 25 and the second projection part 26 contact with the mounting plate 24a. This causes the specific variation in the wheel rotational speed (refer to a time point t1 and a time point t2, shown in FIG. 6). As described above, an angle difference between the position of the first projection part 25 and the position of the second projection part 26 is the predetermined angle $\theta d$. In the memory of the ECU 40, the predetermined angle $\theta d$ has been stored as "a wear determination rotational angle $\theta d$ as one of the registered rotation angles $\theta r$". The ECU 40 determines that the brake pad 23 has worn when a magnitude of difference $\Delta\theta$ ($=|\theta s1-\theta s2|$) between a specific variation rotational angle $\theta s1$ at the time point t1 and a specific variation rotational angle $\theta s2$ at the time point t2 is substantially equal to the predetermined angle $\theta d$.

It should be noted that, in the memory of the ECU 40, a set of a rotational angle $\theta ss1$ and a rotational angle $\theta ss2$ may be stored in advance with correlating the set with the wear of the brake pad, wherein the rotational angle $\theta ss1$ is a rotational angle of the sensor rotor when the first projection part 25 contacts with the mounting plate 24a and the rotational angle $\theta ss2$ is a rotational angle of the sensor rotor when the second projection part 26 contacts with the mounting plate 24a. In this configuration, the ECU determines that the brake pad 23 has worn when the specific variation rotational angle $\theta s1$ substantially coincides with the rotational angle $\theta ss1$ and the specific variation rotational angle $\theta s2$ substantially coincides with the rotational angle $\theta ss2$.

<Factor 2>

While the vehicle is parked/stopped, a position of a part of the frictional sliding part 21a facing with the brake pad 23 remains unchanged. Therefore, rust may be formed between the brake pad 23 and the frictional sliding part 21a. Thereafter, the vehicle moves and frictional sliding part 21a is pressed against (contacts with) the part that has the rust of the frictional sliding part 21a while braking, the specific variation in the wheel rotational speed occurs due to the rust. In view of this, when the vehicle has stopped (has not moved) for a time (time length) equal to or longer than a predetermined time (in other words, at a time point at which a state where all of the wheel rotational speeds of the wheels are "0" continues for the predetermined time), the ECU 40 stores, in the readable and writable nonvolatile memory of the ECU 40, a rotational angle $\theta$ for each wheel 12 at the time point as a stopped state rotational angle $\theta st$ for each wheel 12. Hereinafter, the stopped state rotational angle $\theta st$ may be referred to as a "rust determination angle $\theta st$". When the ECU 40 detects/finds a wheel whose specific variation rotational angle $\theta s$ coincides with the stopped state rotational angle $\theta st$, the ECU 40 determines that the rust has been formed between the brake pad 23 and the frictional sliding part 21a of that wheel.

<Factor 3>

While the disc rotor 21 is being produced by casting (or being casted), an uneven part of a cast structure in the disc rotor 21 may be formed. In the present example, during manufacturing processes of the vehicle, the disc rotor 21 is fixed to the wheel 12 in such a manner that the uneven part of the cast structure is positioned at a predetermined rotational angle (hereinafter, referred to as "a thickness unevenness determination rotational angle $\theta n$") with respect to the reference angle of the sensor rotor. The thickness unevenness determination rotational angle $\theta n$ has been stored in the ROM of the ECU 40 as one of the registered rotation angles $\theta r$.

When the brake pad 23 is frictionally sliding, not only the brake pad 23 but also the disc rotor 21 wears. The uneven part of the cast structure in the disc rotor 21 wears more easily than a part other than the uneven part of the cast structure in the disc rotor 21. When the thickness of the uneven part becomes thinner/smaller than the part other than the uneven part due to the wear, the thickness of the disc rotor 21 becomes uneven. When the brake pad 23 contacts with the uneven part that is thinner than the rest part of the disc rotor 21, the specific variation occurs in the wheel rotational speed. In view of this, the ECU determines that the impermissible unevenness has occurred in the disc rotor 21, when the specific variation rotational angle θs coincides with the thickness unevenness determination rotational angle θn.

As understood from the above descriptions, when the specific variation rotational angle θs coincides with one of "the wear determination rotational angle θd, the stopped state rotational angle θst, and the thickness unevenness determination rotational angle θn" while the specific variation is occurring in the wheel rotational speed, the ECU 40 determines a factor causing the specific variation (defect) is the factor corresponding to the rotational angle with which the specific variation rotational angle θs coincides, and sends the notification message corresponding to the specified factor to the notification execution device 80. In this manner, the ECU 40 can specify the factor causing the specific variation (defect) based on the specific variation, and can notify the driver of the vehicle (or a person/manager who is in charge of the vehicle) of the factor causing the defect.

(Specific Operation)
<Factor Notification Routine>

Hereinafter, the CPU of the ECU 40 is simply referred to as "the CPU" unless otherwise specified. The CPU executes a routine (factor notification routine) shown by a flowchart in FIG. 7 for each wheel 12, independently. The routine is activated (or started) by an interruption when a rising edge of the pulse signal PLS generated by the wheel rotational speed sensor 50 for a certain (focused) wheel 12 is detected.

Figure 7:
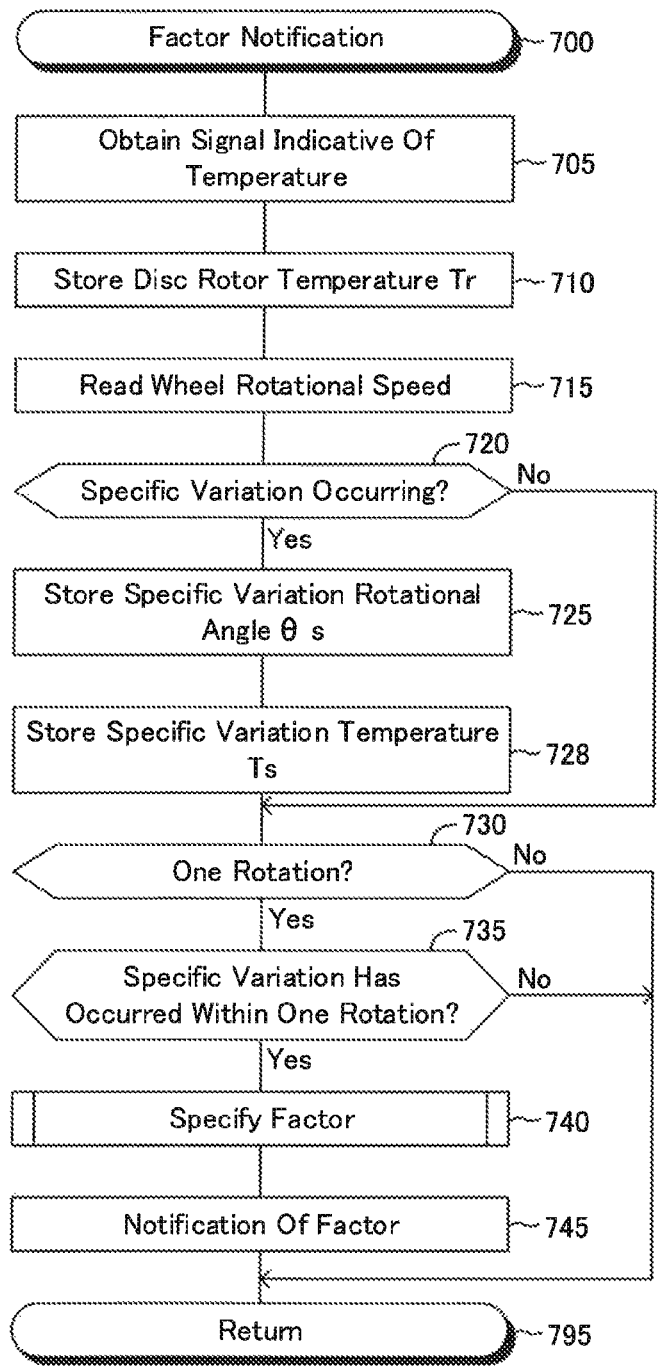
FIG. 7 is a flowchart representing a routine executed by a CPU of the ECU shown in FIG. 1.

Accordingly, when the rising edge of the pulse signal PLS of the focused wheel 12 is detected, the CPU starts processing from step 700 shown in FIG. 7, and executes processes from step 705 to step 715 in this order so as to proceed to step 720.

Step 705: The CPU obtains a signal indicative of the temperature from the disc rotor temperature sensor 60 corresponding to the focused wheel 12.

Step 710: The CPU stores, as the disc rotor temperature Tr of the focused wheel 12, with correlating with the time at which the signal indicative of the temperature from the disc rotor temperature sensor 60 is obtained in the RAM, where the disc rotor temperature Tr is indicated by the signal indicative of the temperature.

Step 715: The CPU reads/fetches the wheel rotational speed of the focused wheel 12 that is calculated in the above manner.

Step 720: The CPU determines whether or not the specific variation has been occurring in the wheel rotational speed of the focused wheel 12 in the above manner.

When the CPU determines that the specific variation has been occurring at step 720, the CPU makes a "Yes" determination, and executes processes of 725 and 728 in this order, and proceeds to step 730.

Step 725: the CPU obtains a rotational angle θ at the time point (hereinafter, referred to as "a specific variation occurrence time point") when the specific variation has occurred, and stores the obtained rotational angle θ as the specific variation rotational angle θs for/of the focused wheel 12 in the RAM.

Step 728: the CPU stores the disc rotor temperature Tr of the focused wheel 12 at the specific variation occurrence time point as a specific variation temperature Ts of the focused wheel 12 in the RAM.

Step 730: the CPU determines whether or not the focused wheel 12 has rotated one rotation (360 degrees). More specifically, the CPU determines that the focused wheel 12 has rotated one rotation when the CPU determines that the reference position of the sensor rotor of the focused wheel 12 has reached the magnetic detection part of the wheel rotational speed sensor 50 after the reference position of the sensor rotor of the focused wheel 12 previously passed the magnetic detection part of the wheel rotational speed sensor 50.

When the CPU decides that the focused wheel 12 has not yet rotated one rotation, the CPU proceeds to step 795 to terminate the present routine tentatively.

Meanwhile, when the CPU decides that the focused wheel 12 has rotated one rotation, the CPU makes a "Yes" determination so as to proceed to step 735. At step 735, the CPU determines whether or not the specific variation has occurred while the focused wheel 12 has rotated one rotation.

When the CPU determines that the specific variation has occurred while the focused wheel 12 has rotated one rotation, the CPU executes processes of step 740 and step 745 in this order. Thereafter, the CPU proceeds to step 795 to terminate the present routine tentatively.

Step 740: The CPU executes "a process for specifying/determining a factor (type of a factor) that has caused the specific variation" that will be described later.

Step 745: The CPU sends/transmits the notification message corresponding to the specified factor that has been specified by the process for specifying a factor together with a signal identifying the focused wheel 12 to the notification execution device 80.

In contrast, when the CPU proceeds to step 720 and determines that the specific variation has not occurred at step 720, the CPU makes a "No" determination, and directly proceeds to step 730.

In addition, when the CPU proceeds to step 735 and determines that the specific variation has not occurred while the focused wheel 12 has rotated one rotation, the CPU makes a "No" determination at step 735. Thereafter, the CPU directly proceeds to step 795 to terminate the present routine tentatively.

<Specifying a Factor Routine>

Figure 8:
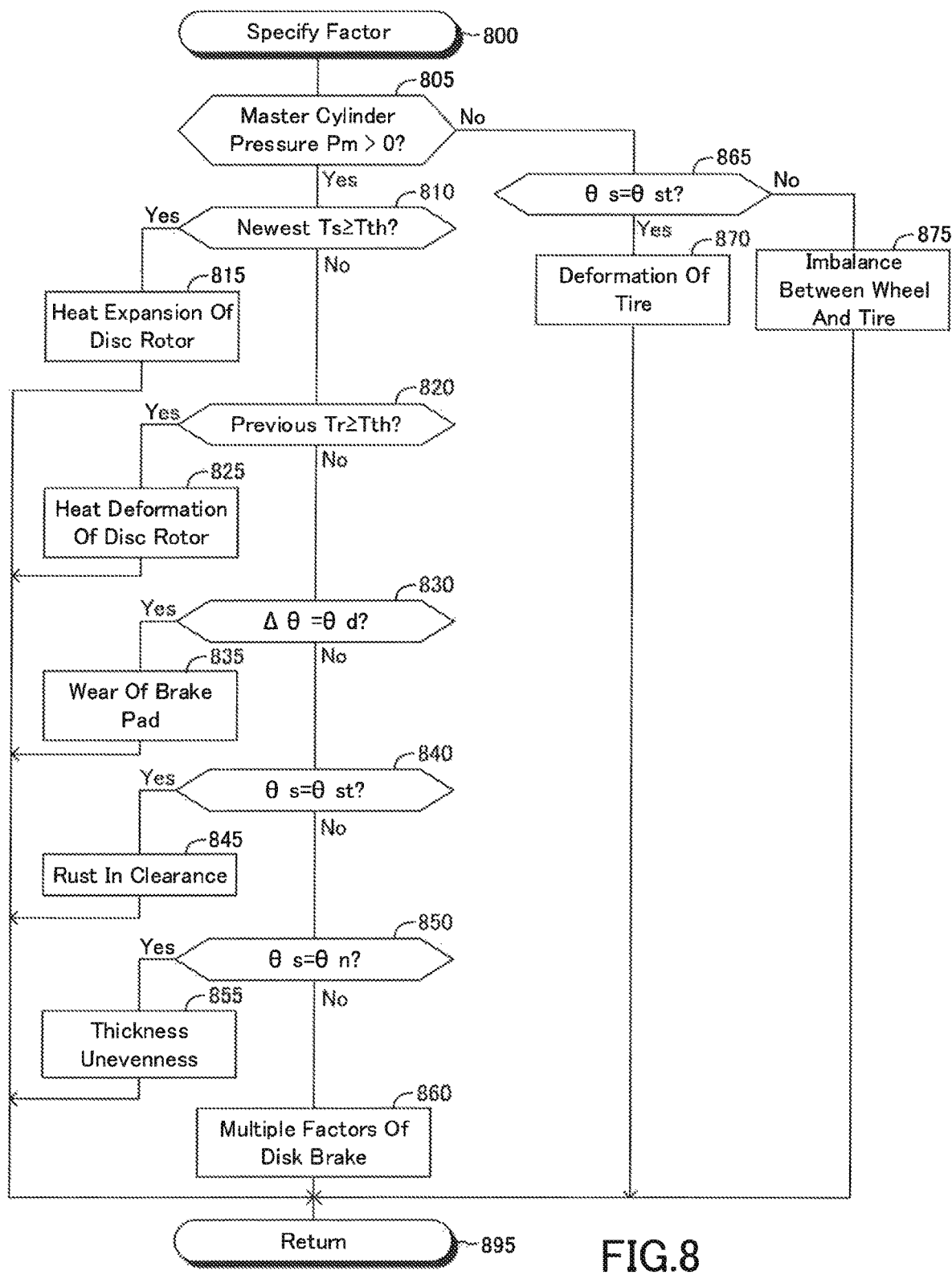
FIG. 8 is a flowchart representing a factor specifying routine of the routine shown in FIG. 7.

When the CPU proceeds to step 740 shown in FIG. 7, the CPU starts processing from step 800 of a sub routine (specifying a factor routine) shown by a flowchart in FIG. 8, and proceeds to step 805.

At step 805, the CPU obtains a measured signal from the pressure sensor 70, and determines whether or not the master cylinder pressure Pm indicated by the measured signal is larger than "0". Namely, the CPU determines whether or not the driver depresses the brake pedal 30 so as to generate a brake requirement. In other words, the CPU determines whether or not the brake pad 23 and the disc rotor 21 generate the frictional sliding torque.

When the CPU determines that the master cylinder pressure Pm is larger than "0", the CPU makes a "Yes" determination at step 805, and proceeds to step 810. At step 810, the CPU determines whether or not the specific variation temperature Ts that has lastly been stored (i.e., the newest specific variation temperature Ts) in the RAM is equal to or higher than a threshold temperature Tth.

When the CPU determines that the newest specific variation temperature Ts is equal to or higher than the threshold temperature Tth, the CPU makes a "Yes" determination at step 810, and proceeds to step 815. At step 815, the CPU determines that the factor that has caused the specific variation is "a heat/thermal expansion at a part of the disc rotor 21 of the focused wheel", and proceeds to step 895 to terminate the present routine tentatively.

The reason/mechanism on how the heat/thermal expansion at the part of the disc rotor 21 causes the specific variation. When a temperature of a small part of the disc rotor 21 becomes extremely high as compared to the rest of the disc rotor 21 (namely, when an unevenness in the temperature of the disc rotor 21 occurs), there are a high temperature part and a low temperature part in the disc rotor 21. In this case, an average temperature of the disc rotor rises, and thus, the specific variation temperature Ts becomes equal to or higher than the threshold temperature Tth. The high temperature part expands more greatly than the low temperature part. This causes a great difference in the frictional sliding torque between when the high temperature part is contacting with the brake pad 23 and when the low temperature part is contacting with the brake pad 23, causing (leading to) the specific variation. Notably, in this case, the deformation of the disc rotor 21 occurs within the range of the elastic deformation.

In contrast, when the CPU determines that the newest specific variation temperature Ts is lower than the threshold temperature Tth, the CPU makes a "No" determination at step 810, and proceeds to step 820.

At step 820, the CPU reads/fetches "a previous disc rotor temperature Tr" that is a disc rotor temperature obtained/detected at a time point a predetermined time before the specific variation occurrence time point. The CPU determines whether or not the previous disc rotor temperature Tr is equal to or higher than the threshold temperature Tth. It should be noted that the previous disc rotor temperature Tr of the focused wheel is stored in the RAM at step 710 shown in FIG. 8.

When the CPU determines that the previous disc rotor temperature Tr is equal to or higher than the threshold temperature Tth, the CPU makes a "Yes" determination at step 820, and proceeds to step 825. When the previous disc rotor temperature Tr is equal to or higher than the threshold temperature Tth, it can be inferred/considered that the temperature of the disc rotor 21 became high before the specific variation has occurred, and the disc rotor 21 thermally deformed beyond the range of the elastic deformation causing the specific variation. Accordingly, at step 825, the CPU determines that the factor that has caused the specific variation is "a heat/thermal deformation of the disc rotor 21 of the focused wheel", and proceeds to step 895 to terminate the present routine tentatively. It should be noted that the threshold temperature Tth used at step 820 is set to be higher than the threshold temperature Tth used at step 810.

Whereas, when the CPU proceeds to step 820 and determines that the previous disc rotor temperature Tr is lower than the threshold temperature Tth, the CPU makes a "No" determination at step 820, and proceeds to step 830.

At step 830, the CPU determines whether or not both of the following conditions are satisfied.

One of the conditions is a condition satisfied when the specific variations have occurred twice per one rotation of the focused wheel.

The other of the conditions is a condition satisfied when a magnitude $\Delta\theta$ of a difference between the specific variation rotational angle $\theta s1$ and the specific variation rotational angle $\theta s2$ substantially coincides with the wear determination rotational angle $\theta d$. In other words, the CPU determines whether or not a magnitude of a difference between the magnitude $\Delta\theta$ of the difference and the wear determination rotational angle $\theta d$ is equal to or smaller than a positive minute threshold. It should be noted that the positive minute threshold may be "0".

When the CPU determines that the above two conditions are satisfied (namely, when the specific variations have occurred twice per one rotation and the magnitude $\Delta\theta$ of the difference substantially coincides with the wear determination rotational angle $\theta d$), the CPU makes a "Yes" determination at step 830, and proceeds to step 835. At step 835, the CPU determines that the factor that has caused the specific variation is "wear of the brake pad 23 corresponding to the focused wheel", and proceeds to step 895 to terminate the present routine tentatively.

In contrast, the CPU determines at least one of the above two conditions is not satisfied (namely, when the specific variations have not occurred twice per one rotation and/or the magnitude $\Delta\theta$ of the difference does not substantially coincide with the wear determination rotational angle $\theta d$), the CPU makes a "No" determination at step 830, and proceeds to step 840.

At step 840, the CPU determines whether or not the specific variation rotational angle $\theta s$ substantially coincides with the stopped state rotational angle $\theta st$. In other words, the CPU determines whether or not a magnitude of a difference between the specific variation rotational angle $\theta s$ and the stopped state rotational angle $\theta st$ is equal to or smaller than a positive minute threshold. It should be noted that the positive minute threshold may be "0". When the CPU determines that the specific variation rotational angle $\theta s$ substantially coincides with the stopped state rotational angle $\theta st$, the CPU makes a "Yes" determination at step 840, and proceeds to step 845. At step 845, the CPU determines that the factor that has caused the specific variation is "rust formed between the brake pad 23 and the frictional sliding part 21a corresponding to the focused wheel", and proceeds to step 895 to terminate the present routine tentatively.

Whereas, when the CPU determines the specific variation rotational angle $\theta s$ does not substantially coincide with the stopped state rotational angle $\theta st$ at step 840, the CPU makes a "No" determination at step 840, and proceeds to step 850.

At step 850, the CPU determines whether or not the specific variation rotational angle $\theta s$ substantially coincides with the thickness unevenness determination rotational angle $\partial n$. In other words, the CPU determines whether or not a magnitude of a difference between the specific variation rotational angle $\theta s$ and the thickness unevenness determination rotational angle $\theta n$ is equal to or smaller than a positive minute threshold. It should be noted that the positive minute threshold may be "0". When the CPU determines that the specific variation rotational angle $\theta s$ substantially coincides with the thickness unevenness determination rotational angle $\theta n$, the CPU makes a "Yes" determination at step 850, and proceeds to step 855. At step 855, the CPU determines that the factor that has caused the specific variation is "thickness unevenness of disc rotor corresponding to the focused wheel", and proceeds to step 895 to terminate the present routine tentatively.

Whereas, when the CPU determines the specific variation rotational angle $\theta s$ does not coincide with the thickness unevenness determination rotational angle $\theta n$ substantially at step 850, the CPU makes a "No" determination at step 850, and proceeds to step 860. At step 860, the CPU determines that the factor that has caused the specific variation is "multiple factors of elements forming the disc brake device 20 (i.e., the disc rotor 2, the brake caliper 22, and the brake pad 23), and proceeds to step 895 to terminate the present routine tentatively.

Meanwhile, when the CPU proceeds to step 805 while the master cylinder pressure Pm is "0", the CPU makes a "No" determination at step 805, and proceeds to step 865. At step 865, the CPU determines whether or not the specific variation rotational angle θs substantially coincides with the stopped state rotational angle θst. In other words, the CPU determines whether or not a magnitude of a difference between the specific variation rotational angle θs and the stopped state rotational angle θst is equal to or smaller than the positive minute threshold. It should be noted that the positive minute threshold may be "0".

When the CPU determines that the specific variation rotational angle θs substantially coincides with the stopped state rotational angle θst, the CPU makes a "Yes" determination at step 865, and proceeds to step 870. At step 870, the CPU determines that the factor that has caused the specific variation is "deformation of the tire formed while the vehicle was stopped", and proceeds to step 895 to terminate the present routine tentatively.

The deformation of the tire formed while the vehicle was stopped will be described. When the vehicle is stopped, a part of the tire contacting the ground becomes flat. That deformed part (flat part) may remain due to various reasons including a decrease in tire pressure after the tire starts to rotate. This deformed part causes the specific variation in the wheel speed.

Whereas, when the CPU determines the specific variation rotational angle θs does not coincide with the stopped state rotational angle θst substantially at step 865, the CPU makes a "No" determination at step 865, and proceeds to step 875. At step 875, the CPU determines that the factor that has caused the specific variation is "imbalance between the wheel and the tire", and proceeds to step 895 to terminate the present routine tentatively.

<Storing Stopped State Rotational Angle Routine>

Figure 9:
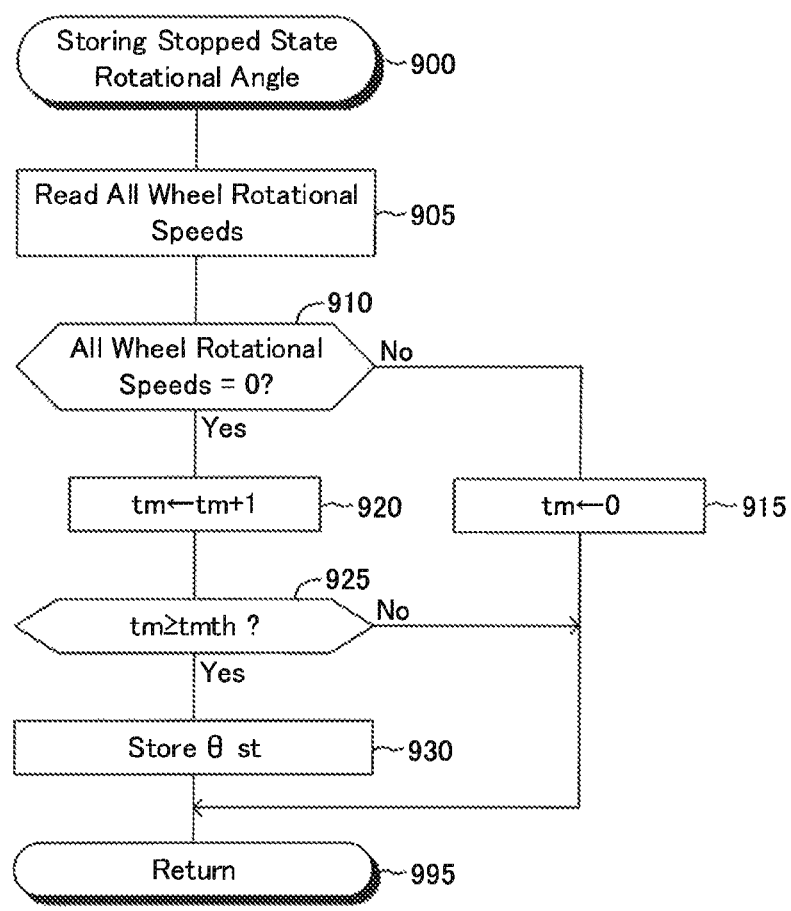
FIG. 9 is another flowchart representing a routine executed by the CPU of the ECU shown in FIG. 1.

The CPU executes a routine (storing stopped state rotational angle routine) shown by a flowchart in FIG. 9 every time a predetermined time elapses. The CPU executes the routine for each wheel 12 independently, regardless of whether an unillustrated ignition key switch is ON or OFF. Hereinafter, it is assumed that the routine shown in FIG. 9 is executed for the focused wheel (one certain wheel 12).

At an appropriate time point, the CPU starts processing from step 900 shown in FIG. 9, and proceeds to step 905 so as to read/fetch the wheel rotational speeds of all of the wheels.

Next, at step 910, the CPU determines whether or not all of the wheel rotational speeds are "0" (namely, whether or not the vehicle has stopped). When the CPU determines at least one of the wheel rotational speeds is not "0", the CPU makes a "No" determination at step 910, and proceeds to step 915 so as to set the timer tm to "0". Thereafter, the CPU proceeds to step 995 to terminate the present routine tentatively.

Whereas, when the CPU determines that all of the wheel rotational speeds are "0" at step 910, the CPU makes a "Yes" determination at step 910, and executes processes of step 920 and step 925 in this order.

Step 920: The CPU adds "1" to the timer tm.
Step 925: The CPU determines whether or not the timer tm is equal to or larger than a threshold tmth.

When the timer tm is smaller than the threshold tmth, the CPU makes a "No" determination at step 925, and proceeds to step 995 to terminate the present routine tentatively. Whereas, when the timer tm is equal to or larger than the threshold tmth, the CPU makes a "Yes" determination at step 925, and proceeds to step 930. At step 930, the CPU stores, in the readable and writable nonvolatile memory of the ECU 40, a current rotational angle θ for each of the wheels as the stopped state rotational angle θst for each of the wheels. Thereafter, the CPU proceeds to step 995 to terminate the present routine tentatively.

As understood from the above, if the specific variation rotational angle θs obtained when the specific variation occurs in the wheel rotational speed coincides one of the stored/registered rotational angles that have been stored/registered, where the each of the stored rotational angles is correlated with a factor (i.e., one of the wear of the brake pad, the rust, and the uneven thickness) causing the specific variation, the present notification apparatus 10 determines that the factor causing the specific variation is the factor that corresponds to the stored/registered rotational angle that is determined to coincide with the specific variation rotational angle θs. Therefore, the factor causing the specific variation can be correctly specified, and the specified factor cane be notified.

The present disclosure should not limited to the above embodiment, and can employ various modifications without departing from the present disclosure. Hereinafter, as typical modifications of the present disclosure, a first to a sixth modified examples will be described.

First Modified Example

In the above embodiment, the disc rotor 21 has two sets of the first projection part 25 and the second projection part 26, however, the disc rotor 21 may have only one set of projection part. In this case, the projection part is formed at a predetermined angle (hereinafter, referred to as "a wear determination rotational angle) θd' with respect to the reference position of the sensor rotor. In addition, in the ROM of the ECU 40, the wear determination rotational angle θd' and the wear of the brake pad as the factor have been stored with correlating them with each other. When the CPU proceeds to step 830 shown in FIG. 8, the CPU determines whether the specific variation rotational angle θs substantially coincides with the wear determination rotational angle θd'. In other words, the CPU determines whether or not a magnitude of a difference between the specific variation rotational angle θs and the wear determination rotational angle θd' is equal to or smaller than a positive minute threshold. It should be noted that the positive minute threshold may be "0". When the specific variation rotational angle θs substantially coincides with the wear determination rotational angle θd', the CPU proceeds to step 835 so as to determine that the factor that has caused the specific variation is "wear of the brake pad 23".

Second Modified Example

Figure 10:
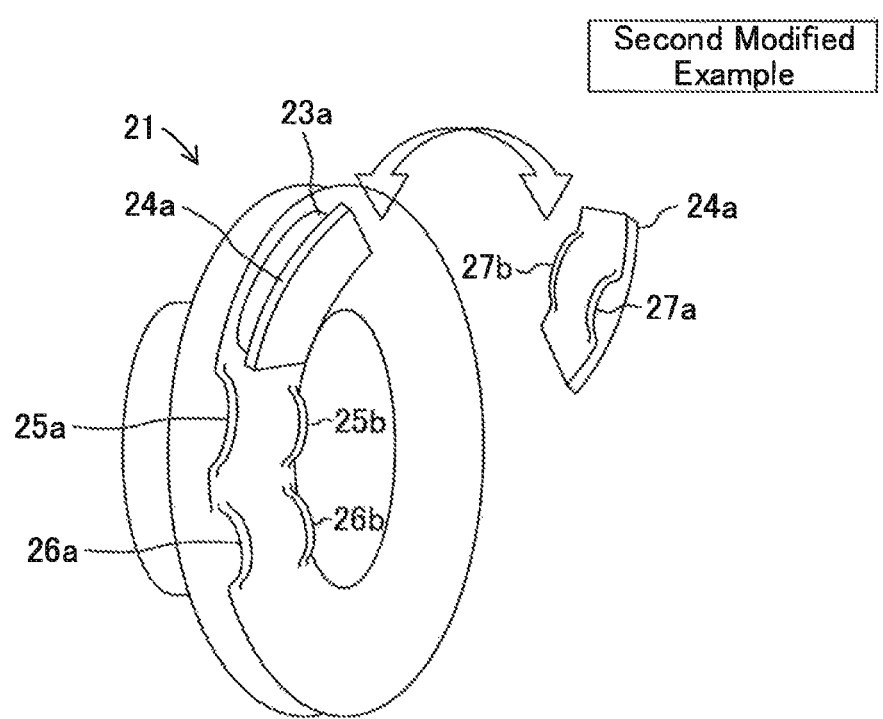
FIG. 10 is an oblique perspective view of a disc rotor according to a second modified example of the present disclosure.

As shown in FIG. 10, one set of a mounting plate projection part 27a and a mounting plate projection part 27b may be formed on the mounting plate 24a. When the projection part 27a and the projection part 27b need not to be distinguished from each other, each of them is referred to as "a mounting plate projection part 27". When the brake pad 23a has worn by the predetermined amount or more, the mounting plate projection part 27a contacts with the first projection part 25a and the second projection part 26a, and the mounting plate projection part 27b contacts with the first projection part 25b and the second projection part 26b. The vibration amplitude of the specific variation occurring when the first projection part 25 and the second projection part 26 contact with the mounting plate projection part 27 is much greater than the vibration amplitude of the specific variation occurring when the first projection part 25 and the second projection part 26 contact with the mounting plate 24a on which the mounting plate projection parts 27a and 27b are not formed. Thus, according to the second modified example, the CPU can more correctly determine whether or not the specific variation has occurred at step 720 shown in FIG. 7.

Third Modified Example

Figure 11:
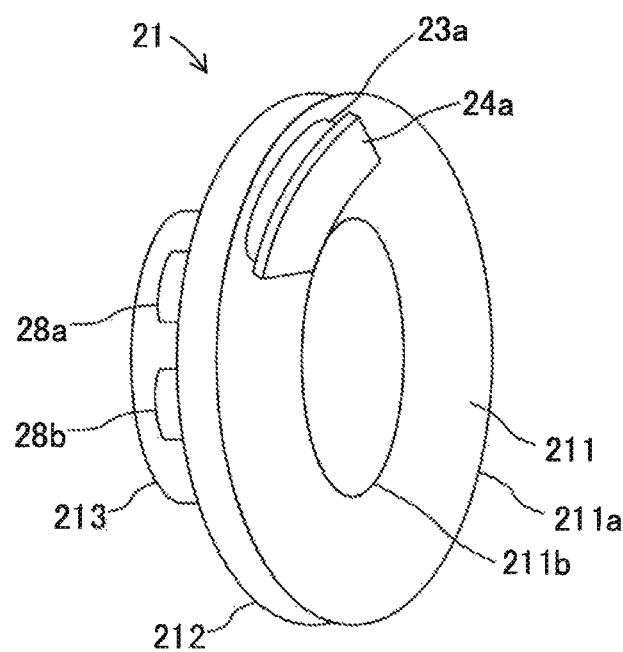
FIG. 11 is an oblique perspective view of a disc rotor according to a third modified example of the present disclosure.

As shown in FIG. 11, in the third modified example, a plurality of projection parts (namely, a projection part 28a and a projection part 28b) are formed on the second sliding surface 212 in such a manner that they are apart from each other with the central angle θd that is equal to the wear determination rotational angle θd. Whereas, in the third modified example, neither the first projection part 25 nor the second projection part 26 is formed on the first sliding surface 211.

The projection part 28a and the projection part 28b are formed so as to project toward the mounting plate 24b in such a manner that the projection part 28a and the projection part 28b do not contact the brake pad 23b. More specifically, a height of each of the projection part 28a and the projection part 28b is set in such a manner that the mounting plate 24b starts contacting the projection part 28a and the projection part 28b when the brake pad 23b has worn by the predetermined amount. It can be said that the projection part 28a and the projection part 28b are the parts projecting from a fixing part 213 in a radial direction of the disc rotor 21. The fixing part 213 is for fixing the disc rotor 21 to the vehicle body and projects from an inner peripheral part of the second sliding surface 212. The projection part 28a and the projection part 28b may be integrally formed with the disc rotor 21, or may be separate members for forming the projection part 28a and the projection part 28b that are fixed to the disc rotor 21.

Fourth Modified Example

In the above embodiment, the disc rotor 21 is fixed to the vehicle body (wheel 12) in such a manner that the uneven part of the disc rotor 21 is positioned at the thickness unevenness determination rotational angle θn with respect to the reference angle of the sensor rotor. Whereas, in the fourth modified example, a particular shape (hereinafter, referred to as a "variation causing shape" that may include a dent) is formed at the uneven part of the disc rotor 21 wherein the variation causing shape allows one of uneven part variation generating conditions described below to be satisfied, but does now allows the wheel speed to satisfy any of the specific variation occurrence conditions.

(Uneven Part Variation Generating Condition No. 1)

Hereinafter, the "permissible range within which the current speed Vw(n) is inferred to fall" defined and used in the specific variation occurrence condition No. 1 is referred to as "a permissible range No. 1". A permissible range No. 2 is defined. The permissible range No. 2 is narrower than the permissible range No. 1 and is included in the permissible range No. 1. The CPU determines that the uneven part variation generating condition No. 1 is satisfied, when the current speed Vw(n) is out of the permissible range No. 2 but is within the permissible range No. 1.

(Uneven Part Variation Generating Condition No. 2)

The CPU determines that the uneven part variation generating condition No. 2 is satisfied, when the magnitude $\Delta V1$ of the difference used in the specific variation occurrence condition No. 2 is equal to or larger than a positive threshold $\Delta Vw1th'$ and is smaller than the threshold $\Delta Vw1th$. The positive threshold $\Delta Vw1th'$ is set at a value smaller than the threshold $\Delta Vw1th$.

(Uneven Part Variation Generating Condition No. 3)

The CPU determines that the uneven part variation generating condition No. 3 is satisfied, when the magnitude $\Delta V2$ of the difference used in the specific variation occurrence condition No. 3 is equal to or larger than a positive threshold $\Delta Vw2th'$ and is smaller than the threshold $\Delta Vw2th$. The positive threshold $\Delta Vw2th'$ is set at a value smaller than the threshold $\Delta Vw2th$.

(Uneven Part Variation Generating Condition No. 4)

When "the number of times of successively determining that the magnitude $\Delta V2$ is equal to or larger than the positive threshold $\Delta Vw2th'$ and is smaller than the threshold $\Delta Vw2th$ becomes equal to or greater than a predetermined number, the CPU determines that the uneven part variation generating condition No. 4 is satisfied.

As the uneven part variation generating conditions, at least one of the above uneven part variation generating conditions No. 1 to No. 4 is employed.

In this fourth modified example, at step 850 shown in FIG. 8, the CPU obtains, as a determination wheel speed, the wheel speed in a determination section (period) that includes the time point at which the specific variation has occurred, and determines whether or not the obtained determination wheel speed satisfies the uneven part variation generating condition(s). When the CPU determines that the obtained determination wheel speed satisfies the uneven part variation generating condition(s) so as to determine that the uneven part variation has been occurring, the CPU proceeds to step 855 so as to determine that the factor that has caused the specific variation is "thickness unevenness of disc rotor 21".

Fifth Modified Example

Rust may be formed on the surfaces of the disc rotor 21. The rust is referred to as "a rotor rust", hereinafter. In the fifth modified example, the rotor rust is determined to be a factor causing the specific variation, based on the specific variation in the wheel speed. The fifth modified example will next be described with reference to FIG. 12.

Figure 12:
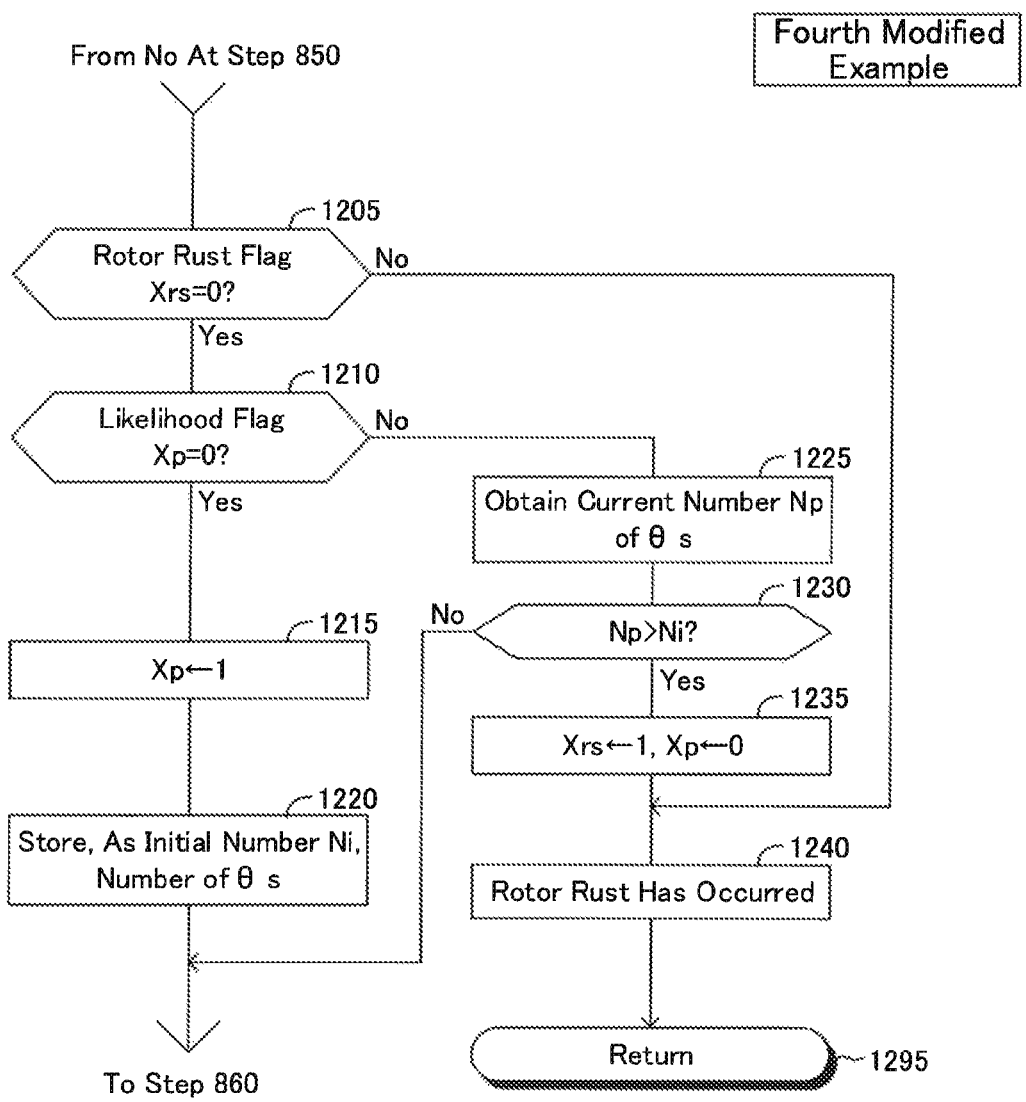
FIG. 12 is a flowchart representing a routine executed by a CPU of an ECU according to a fourth modified example of the present disclosure.

The CPU of the fifth modified example proceeds to step 1205 shown in FIG. 12 if the CPU makes a "No" determination at step 850 shown in FIG. 8. The CPU determines whether or not a value of a rotor rust flag Xrs is "0" of/for a focused wheel at step 1205. It should be noted that the rotor rust flag Xrs is provided for each wheel 12.

The value of the rotor rust flag Xrs is set to "1" when it is determined that the factor causing the specific variation is the rotor rust (refer to step 1235 described later). The value of the rotor rust flag Xrs is set to "0" when a predetermined button is operated after the disc rotor 21 is polished or the disc rotor 21 is replaced with a new one.

When the CPU determines that the value of the rotor rust flag Xrs is "0", the CPU makes a "Yes" determination at step 1205 so as to proceed to step 1210. At step 1210, the CPU determines whether or not a value of a likelihood flag Xp is "0" of/for the focused wheel. It should be noted that the likelihood flag Xp is provided for each wheel 12.

The value of the likelihood flag Xp is set to "1" at step 1215 described later. The value of the likelihood flag Xp is set to "0" at step 1235 described later.

When the CPU determines that the value of the likelihood flag Xp is "0", the CPU proceeds to processes of step 1215 and 1220, in this order, and proceeds to step 860 shown in FIG. 8.

Step 1215: The CPU sets the value of the likelihood flag Xp to "1".

Step 1220: The CPU stores, as an initial number Ni, "the number N of the specific variation rotational angle θs" per one rotation for/of the focused wheel 12 that is stored in the RAM at step 725 shown in FIG. 7.

Thereafter, when the CPU determines that the value of the likelihood flag Xp is "1" (namely, when the CPU makes a "No" determination) at step 1210, and proceeds to step 1225. At step 1225, the CPU obtains, as a current number Np, the number N of the specific variation rotational angle θs per one rotation, and proceeds to step 1230.

At step 1230, the CPU determines whether or not the current number Np is greater than the initial number Ni. When the CPU determines that the current number Np is greater than the initial number Ni (namely, when the CPU makes a "Yes" determination), the CPU proceeds to processes of step 1235 and 1240, in this order. Thereafter, the CPU proceeds to step 1295 to terminate the present routine tentatively.

Step 1235: The CPU sets the value of the rotor rust flag Xrs to "1", and sets the value of the likelihood flag Xp to "0".

Step 1240: The CPU determines that the factor causing the specific variation is the rotor rust formed on the surfaces of the disc rotor 21.

Whereas, when the value of the rotor rust flag Xrs is "1", the CPU makes a "No" determination at step 1205, and proceeds to step 1240. In this manner, once the value of the rotor rust flag Xrs is set to "1", the CPU continues determining that the factor causing the specific variation is the rotor rust unless the other factor starts to cause the specific variation or the above described predetermined button is operated.

Whereas, the current number Np is equal to or smaller than the initial number Ni, the CPU makes a "No" determination at step 1230, and proceeds to step 860 shown in FIG. 8.

As understood from the above, the ECU 40 of the fifth modified example determines that the factor causing the specific variation is the rotor rust when the number of the specific variation rotational angle θs is increasing. Accordingly, the ECU 40 can correctly determine that the rotor rust has been formed.

Sixth Modified Example

The wheel rotational speed sensor 50 described above is an "absolute rotational position (angle) detection sensor" that can detect an absolute rotational position (angle) of each wheel 12. However, the wheel rotational speed sensor 50 may be a "relative rotational position (angle) detection sensor" that can detect a relative rotational position (angle) of each wheel 12. The sixth modified example employs the relative rotational position (angle) detection sensors as the wheel rotational speed sensor 50.

When the relative rotational position (angle) detection sensors are employed, the ECU 40 obtains wheel rotational speed based on a time (time length) Δt between two adjacent/successive rising edges of the pulse signal PLS, similarly to the case where the absolute rotational position (angle) detection sensor are employed. In addition, the ECU 40 adds "1" to a counter every time the rising edge is detected. The ECU 40 determines that the wheel 12 rotates one rotation (360 degrees) when the counter reaches a "predetermined value that the counter reaches when wheel 12 rotates one rotation". A sensor rotor of the relative rotational position (angle) detection sensor does not have a reference position. Accordingly, the ECU 40 initializes the counter (i.e., sets the counter to "0") at a timing described later (refer to step 1315 shown in FIG. 13). The position of the sensor rotor that faces with the magnetic detection part at the time point at which the counter is initialized is set as the reference position.

Figure 13:
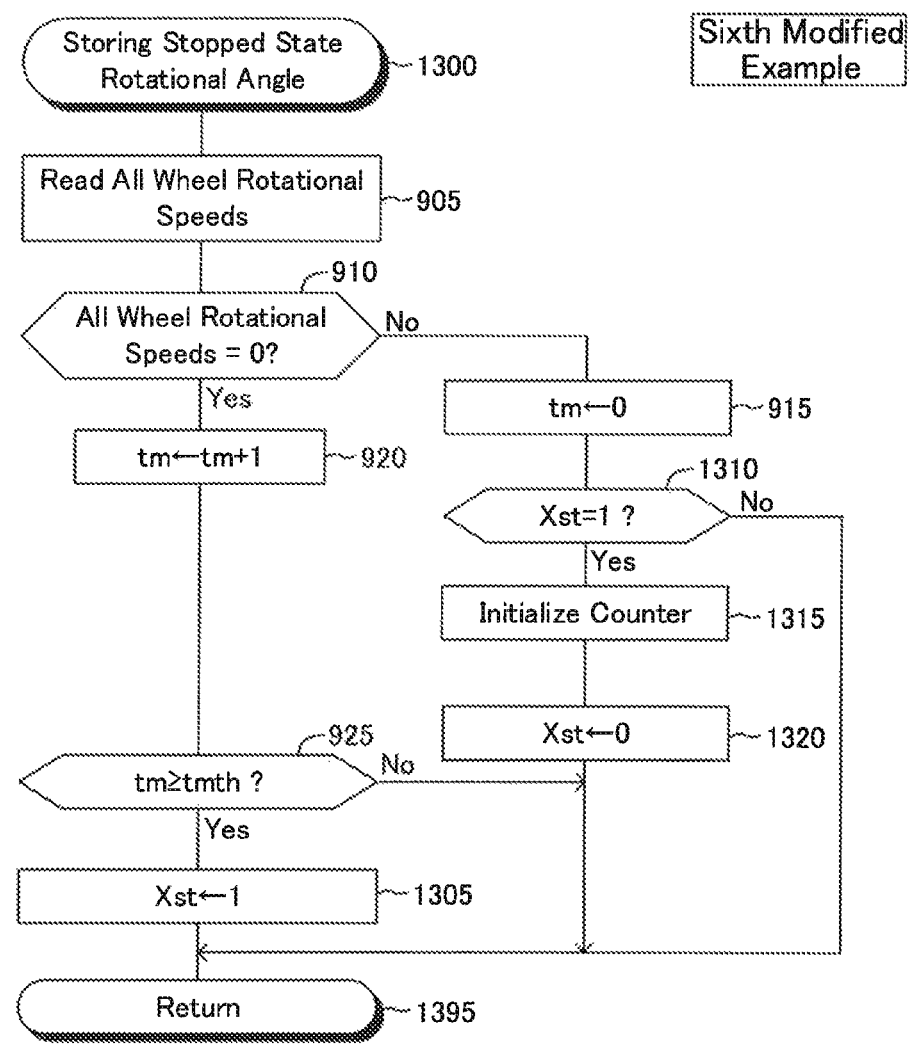
FIG. 13 is a flowchart representing a routine executed by a CPU of an ECU according to a sixth modified example of the present disclosure.

When the relative rotational position (angle) detection sensors are employed, the CPU of the ECU 40 employs the fourth modified example at step 850 shown in FIG. 8, and executes a routine shown by a flowchart in FIG. 13 in place of the routine shown in FIG. 9. Each step shown in FIG. 13 at which the same processing is performed as each step shown in FIG. 9 is given the same step symbol as one given to such step shown in FIG. 9. The description thereof is omitted.

The CPU starts to execute processes from step 1300 of the routine shown by the flowchart in FIG. 13 every time a predetermined time elapses. When the timer tm is equal to or larger than the threshold tmth, the CPU makes a "Yes" determination at step 925 shown in FIG. 13, and proceeds to step 1305 so as to set a value of a stopped vehicle flag Xst to "1". It should be noted that the value of the stopped vehicle flag Xst is set to "1" at the above described step 1305, and is set to "0" at step 1320 described later.

Furthermore, when the CPU proceeds to step 1310 after the CPU executes the process of step 915 shown in FIG. 13, the CPU determines whether or not the value of the stopped vehicle flag Xst is "1". When the CPU determines that the value of the stopped vehicle flag Xst is "1" (namely, when the CPU makes a "Yes" determination at step 1310), the CPU executes processes of step 1315 and step 1320, in this order. Thereafter, the CPU proceeds to step 1395 to terminate the present routine tentatively.

Step 1315: The CPU initializes the counter for the focused wheel so as to set (store) the reference position of the sensor rotor.

Step 1320: The CPU sets the value of the stopped vehicle flag Xst is "0".

Whereas, when the CPU determines that the value of the stopped vehicle flag Xst is "0" (namely, when the CPU makes a "No" determination at step 1310), the CPU proceeds to step 1395 to terminate the present routine tentatively.

At step 840 and step 865, both shown in FIG. 8, the CPU determines whether or not the specific variation rotational angle θs is an angle ("0") corresponding to the above reference position. In other words, the CPU determines whether or not the value of the counter is "0". When the value of the counter is "0", the CPU makes a "Yes" determination at step 840 and at step 865.

As understood from the above, the relative rotational position (angle) detection sensors may be employed as the wheel rotational speed sensor 50.

Seventh Modified Example

The ECU 40 may be configured to transmit a notification message instruction corresponding to the specified factor that has caused the specific vibration to a management system that manages the vehicles via a network. The management system may be configured to generate a notification message in response to the notification message instruction. In this case, the management system notifies a system manager of the specified factor that has caused the specific vibration.

Furthermore, in the above embodiments, the brake requirement is generated when the driver depresses the brake pedal 30, however, the brake requirement may also be generated when unillustrated drive assistance ECU determines that the vehicle VA is likely to collide with an obstacle.

In addition, at step 830 shown in FIG. 8, the CPU determines whether or not the magnitude $\Delta\theta$ of the difference between the angles obtained when the specific variation has occurred coincides with the wear determination rotational angle $\theta d$, however, the CPU may determine whether or not a magnitude of a difference between angles obtained when a specific variation in the pressure in the cylinder part 22a has occurred coincides with the wear determination rotational angle $\theta d$.

It should be noted that the ECU 40 may obtain the wheel rotational speed based on the number of the rising edge of the pulse signal PLS from the wheel rotational speed sensor 50 per predetermined unit time.

What is claimed is:

1. A vehicle notification apparatus comprising:
   a brake device configured to press a frictional member against a rotating member rotating integrally with a wheel, when a brake requirement for a vehicle is generated so as to apply frictional brake torque to said wheel;
   a wheel rotational speed sensor configured to generate a detection signal every time said wheel rotates by a predetermined angle;
   a notification execution device configured to notify a passenger of said vehicle or a manager of said vehicle; and
   a control unit configured to obtain a wheel rotational speed that is a rotational speed of said wheel based on the detection signal,
   wherein,
   said control unit is configured to:
      determine whether or not said wheel rotational speed satisfies a predetermined specific variation occurrence condition;
      determine that a specific variation in said wheel rotational speed that does not occur in a normal driving state has occurred, when said wheel rotational speed is determined to satisfy said predetermined specific variation occurrence condition;
      obtain, as a specific variation rotational angle position, a rotational position of when said specific variation has occurred with reference to a predetermined reference position of said wheel, based on said detection signal;
      specify a factor that has caused said specific variation based on said specific variation rotational angle position; and
      let said notification execution device notify said passenger or said manager of information regarding said specified factor.

2. The vehicle notification apparatus according to claim 1, wherein,
   said control unit is configured to:
      have stored a plurality of factors causing said specific variation and a plurality of registered rotation angles in a memory while correlating said factors with said registered rotation angles, respectively; and
      determine that said factor actually causing said specific variation is one of said factors that has been stored in said memory and that is correlated with one of said registered rotation angles that is determined to coincide with said specific variation rotational angle position.

3. The vehicle notification apparatus according to claim 2, wherein,
   said brake device comprises a mounting plate configured to press said frictional member against said rotating member;
   said rotating member comprises a first projection part and a second projection part that said mounting plate contact when said frictional member has worn by a predetermined amount or more so as to cause said specific variation, wherein said first projection part and said second projection part are formed in such a manner that said first projection part and said second projection part are apart from each other to form a predetermined central angle with reference to a rotation center of said rotating member; and
   said control unit is configured to:
      have stored wear of said frictional member as one of said plurality of said factors and said predetermined central angle as one of said plurality of registered rotation angles in said memory while correlating said wear of said frictional member with said predetermined central angle;
      obtain, when said specific variation has occurred twice per one rotation of said wheel while said brake requirement is being generated, a magnitude of difference between said specific variation rotational angle positions, each being detected when each of said specific variation has occurred, as a rotational angle corresponding to said specific variation rotational angle position; and
      determine that said factor actually causing said specific variation is said wear of said frictional member, when said obtained magnitude of difference as said rotational angle is determined to coincide with said predetermined central angle stored as one of said plurality of registered rotation angles.

4. The vehicle notification apparatus according to claim 2, wherein,
   said brake device comprises a mounting plate configured to press said frictional member against said rotating member;
   said rotating member comprises a projection part that said mounting plate contact when said frictional member has worn by a predetermined amount or more so as to cause said specific variation, wherein said projection part is formed at a predetermined wear determination rotational angle position with reference to said reference position; and
   said control unit is configured to:
      have stored wear of said frictional member as one of said plurality of said factors and said wear determination rotational angle position as one of said plurality of registered rotation angles in said memory while correlating said wear of said frictional member with said wear determination rotational angle position; and
      determine that said factor actually causing said specific variation is said wear of said frictional member, when said specific variation rotational angle position is determined to coincide with said wear determination rotational angle position while said brake requirement is being generated.

5. The vehicle notification apparatus according to claim 2, wherein, said rotating member is fixed to said vehicle in such a manner that an uneven part of a cast structure in said rotating member is positioned at a thickness unevenness determination rotational angle position with reference to said reference position; and said control unit is configured to:

have stored thickness unevenness caused by said uneven part and a part other than said uneven part as one of said plurality of said factors and said thickness unevenness determination rotational angle position as one of said plurality of registered rotation angles in said memory while correlating said thickness unevenness with said thickness unevenness determination rotational angle position; and determine that said factor actually causing said specific variation is said thickness unevenness, when said specific variation rotational angle position is determined to coincide with said thickness unevenness determination rotational angle position while said brake requirement is being generated.

6. The vehicle notification apparatus according to claim 2, wherein, said control unit is configured to:

have stored rust formed between said frictional member and said rotating member while said vehicle is stopped as one of said plurality of said factors and a stopped state rotational angle position as one of said plurality of registered rotation angles in said memory while correlating said rust with said stopped state rotational angle position, wherein said stopped state rotational angle position is a rotational angle position obtained when a stopped time length of said vehicle reaches a predetermined time; and determine that said factor actually causing said specific variation is said rust, when said specific variation rotational angle position is determined to coincide with said stopped state rotational angle position while said brake requirement is being generated.

7. The vehicle notification apparatus according to claim 2, wherein, said control unit is configured to:

have stored deformation of a tire included in said wheel that is formed at a part of said tire contacting a ground while said vehicle is stopped as one of said plurality of said factors and a stopped state rotational angle position as one of said plurality of registered rotation angles in said memory while correlating said deformation of said tire with said stopped state rotational angle position, wherein said stopped state rotational angle position is a rotational angle position obtained when a stopped time length of said vehicle reaches a predetermined time; and determine that said factor actually causing said specific variation is said deformation of said tire, when said specific variation rotational angle position is determined to coincide with said stopped state rotational angle position while said brake requirement is not being generated.

\* \* \* \* \*